United States Patent
White et al.

(10) Patent No.: US 9,975,436 B2
(45) Date of Patent: May 22, 2018

(54) REGENERATION STRATEGY FOR A VEHICLE HAVING DECOUPLED FRONT AND REAR AXLE DRIVE ACTUATORS

(71) Applicant: GM GLOBAL TECHNOLOGY OPERATIONS LLC, Detroit, MI (US)

(72) Inventors: Marsella L. White, Howell, MI (US); Michael G. Petrucci, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 15/163,110

(22) Filed: May 24, 2016

(65) Prior Publication Data
US 2017/0072780 A1  Mar. 16, 2017

Related U.S. Application Data

(60) Provisional application No. 62/217,850, filed on Sep. 12, 2015.

(51) Int. Cl.
| | |
|---|---|
| B60W 10/06 | (2006.01) |
| B60L 11/18 | (2006.01) |
| B60W 20/13 | (2016.01) |
| B60W 10/08 | (2006.01) |
| B60K 6/52 | (2007.10) |
| B60W 10/184 | (2012.01) |
| B60W 10/26 | (2006.01) |
| B60W 30/18 | (2012.01) |
| B60W 20/14 | (2016.01) |

(52) U.S. Cl.
CPC ............ *B60L 11/1809* (2013.01); *B60K 6/52* (2013.01); *B60W 10/06* (2013.01); *B60W 10/08* (2013.01); *B60W 10/184* (2013.01); *B60W 10/26* (2013.01); *B60W 20/13* (2016.01); *B60W 20/14* (2016.01); *B60W 30/18127* (2013.01); *B60W 30/18136* (2013.01); *B60W 2510/244* (2013.01); *B60W 2540/10* (2013.01); *B60W 2540/12* (2013.01); *B60Y 2300/89* (2013.01); *Y02T 10/6265* (2013.01); *Y02T 10/6286* (2013.01)

(58) Field of Classification Search
None
See application file for complete search history.

(56) References Cited

U.S. PATENT DOCUMENTS

| | | | | |
|---|---|---|---|---|
| 7,934,779 B2* | 5/2011 | Kodama | ............ | B60K 6/44 303/115.3 |
| 9,630,522 B2* | 4/2017 | Ketfi-Cherif | ............ | B60K 6/52 |
| 2009/0120699 A1* | 5/2009 | Suzuki | ............ | B60K 6/445 180/65.265 |

* cited by examiner

*Primary Examiner* — Redhwan K Mawari
*Assistant Examiner* — Edward Torchinsky
(74) *Attorney, Agent, or Firm* — Quinn IP Law

(57) ABSTRACT

A method of controlling a vehicle having a first axle driven by an internal combustion engine, and a second axle independently driven by an electric device includes determining if the accelerator pedal is disposed in a depressed position or in a non-depressed position, and determining if a brake pedal is disposed in a depressed position or in a non-depressed position. An axle control strategy for controlling energy regeneration of an energy storage device is selected based on the position of the accelerator pedal being in either the depressed position or the non-depressed position, and the position of the brake pedal being in either the depressed position or the non-depressed position. A control signal is communicated to at least one of the first axle or the second axle to implement the selected axle control strategy.

17 Claims, 3 Drawing Sheets

REGENERATION STRATEGY FOR A VEHICLE HAVING DECOUPLED FRONT AND REAR AXLE DRIVE ACTUATORS

CROSS-REFERENCE TO RELATED APPLICATIONS

This application claims the benefit of U.S. Provisional Patent Application Ser. No. 62/217,850, filed on Sep. 12, 2015, the disclosure of which is hereby incorporated by reference.

TECHNICAL FIELD

The disclosure generally relates to a method of controlling a hybrid vehicle.

BACKGROUND

There are many different configurations of hybrid and/or all electric vehicles. Some embodiments of hybrid vehicles provide drive torque to the wheels of both a front axle and the wheels of a rear axle. Accordingly, the wheels of the front axle are provided with drive torque to propel the vehicle, as well as the wheels of the rear axle being provided with drive torque to propel the vehicle. The wheels of the front axle and the wheels of the rear axle may be provided with their respective drive torque by one or more power sources, which may include but are not limited to an internal combustion engine and/or an electric motor. For example, a front axle may be powered by an electric device, and the rear axle may be powered by an internal combustion engine. Alternatively, all the wheels of the front axle, and all the wheels of the rear axle may each be powered by independent electric devices.

The front axle and the rear axle may be either coupled, or de-coupled. If the front axle and the rear axle are coupled, then the first axle and the second axle are mechanically linked together, and are capable of directly transferring torque therebetween. If the front axle and the rear axle are de-coupled, then the front axle and the rear axle are not mechanically linked together, may be considered separated mechanical systems, and are not capable of directly transferring torque therebetween.

Hybrid vehicles may convert kinetic energy from the rotating wheels into some other form of energy. For example, hybrid vehicles using an electric device to provide a propulsive force to an axle typically include an energy storage device, e.g., a battery or other similar device. The energy storage device must be charged, referred to herein as regeneration. Regeneration of the energy storage device may be accomplished in several different ways. For example, the energy storage device may be regenerated through a regenerative braking process, in which energy used to decelerate the vehicle is converted into electrical energy that is stored in the energy storage device. The regenerative braking process may be implemented at one or both of the front axle and/or the rear axle. Alternatively, the electric device (or a second electric device) may be operated as a generator to charge the energy storage device. The control strategy used to control the internal combustion engine and/or the electric device determines how the energy storage device is regenerated for specific, different vehicle dynamic operating conditions, such as forward acceleration or deceleration, lateral acceleration, engine torque, etc. Alternatively, the kinetic energy from the wheels may be converted into a form of energy other than electrical energy. For example, the energy storage device may include a weighted flywheel, in which case the kinetic energy from the wheels is transferred to kinetic energy of the flywheel.

SUMMARY

A method of controlling a vehicle having a first axle driven by a first power source, and a second axle driven by a second power source, is provided. The first power source and the second power source are de-coupled, i.e., they are mechanically independent of each other, and do not directly communicate torque to each other. The method includes sensing a position of an accelerator pedal to determine if the accelerator pedal is disposed in a depressed position, or if the accelerator pedal is disposed in a non-depressed position. A position of a brake pedal is sensed to determine if the brake pedal is disposed in a depressed position, or if the brake pedal is disposed in a non-depressed position. An axle control strategy for controlling energy regeneration of an energy storage device is selected based on the position of the accelerator pedal being in either the depressed position or the non-depressed position, and the position of the brake pedal being in either the depressed position or the non-depressed position. A control signal is sent to at least one of the first axle or the second axle to implement the selected axle control strategy.

Accordingly, the vehicle may be controlled based on several different axle control strategies to provide optimal regeneration of the energy storage device for the specific operating conditions of the vehicle. The axle control strategies enable the maximum amount of energy regeneration for the energy storage device for a wide variety of operating conditions of the vehicle, including high performance operating conditions such as on a race track, where energy regeneration may not have previously been permitted.

The above features and advantages and other features and advantages of the present teachings are readily apparent from the following detailed description of the best modes for carrying out the teachings when taken in connection with the accompanying drawings.

DETAILED DESCRIPTION

Figure 1:
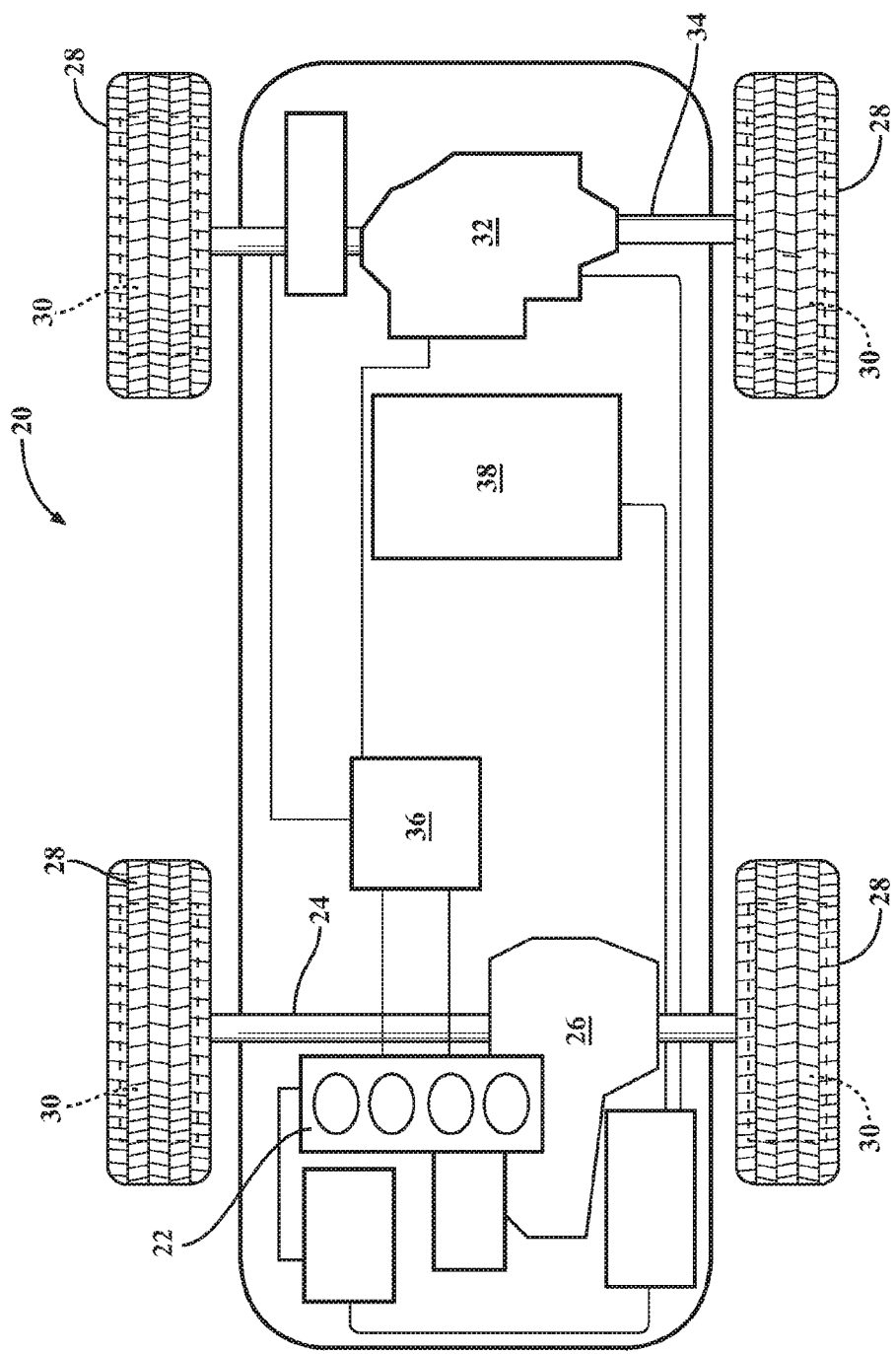
FIG. 1 is a schematic plan view of a vehicle.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a method of controlling a hybrid vehicle 20 is generally described. The vehicle 20 may include any type and/or style of vehicle that includes a first power source 22 coupled to a first axle 24, and a second power source 32 coupled to a second axle 34, in which the first axle 24 and the second axle 34 are de-coupled, and are not capable of directly transmitting torque therebetween. The first power source 22 and the second power source 32 may each include, but are not limited to an internal combustion engine and/or an electric motor. It should be appreciated that some other type of power source may also be used for the first power source 22 or the second power source 32. Additionally, each wheel 28 of each of the first axle 24 and the second axle 34 may include a respective power source. For example, each wheel 28 of the front axle 24 and each wheel 28 of the second axle 34 may include a separate electric motor for providing propulsive or drive torque to their respective wheels 28. In some embodiments, the wheels 28 of only one of the first axle 24 or the second axle 34 are used for regeneration of an energy storage device 38. The energy storage device 38 may include, but is not limited to, a battery or other similar device capable of storing an electrical charge, or may alternatively include a device capable of storing kinetic energy, such as a weighted flywheel.

One exemplary embodiment of the vehicle 20 is shown in FIG. 1. It should be appreciated that the vehicle 20 may be configured differently than shown in FIG. 1, and that the exemplary embodiment of the vehicle 20 shown in FIG. 1 is provided merely to aid in the understanding of this disclosure. Accordingly, the scope of this disclosure should not be limited to the configuration and specific components of the vehicle 20 shown in FIG. 1 and described herein. As shown in FIG. 1 and described herein, the first power source 22 includes and is hereinafter referred to as an internal combustion engine 22, and the second power source 32 includes and is hereinafter referred to as an electric device 32. In the exemplary embodiment shown in FIG. 1 and described herein, the electric device 32, may include but is not limited to a motor/generator, which is capable of converting kinetic energy of the vehicle 20 into electrical energy, which may be stored in the energy storage device 38 for later use by the electric device 32 for providing a propulsive force or torque to propel the vehicle 20.

Referring to FIG. 1, the internal combustion engine 22 is coupled to the first axle 24, and is operable to provide the first axle 24 with a propulsive force or torque. The internal combustion engine 22 may include any suitable type of engine, such as but not limited to a diesel engine, a gasoline engine, a natural gas engine, etc. Furthermore, the internal combustion engine 22 may be configured in any suitable style, such as but not limited to an inline configuration, a V-style configuration, a rotary configuration, etc. The internal combustion engine 22 may be coupled to the first axle 24 in any suitable manner, using any suitable components, such as but not limited to a gearbox or transmission 26, differential, drive shaft etc. The internal combustion engine 22 operates as is known in the art. As such, the specific details and operation of the internal combustion engine 22 are not described in detail herein. Additionally, the specific manner in which the internal combustion engine 22 is coupled to and transfers torque to the first axle 24 is not pertinent to the teachings of this disclosure, and is therefore not described in detail herein.

The first axle 24 may be configured in any suitable manner to transfer the propulsive torque from the internal combustion engine 22 to at least one wheel 28 attached to the first axle 24. The first axle 24 includes a friction braking device 30 located at each wheel 28 of the first axle 24. The friction braking devices 30 of the first axle 24 uses friction to slow rotation of an associated wheel 28, to decelerate the vehicle 20, as is known in the art. The specific configuration and operation of the first axle 24 and the friction braking devices 30 of the first axle 24 are not pertinent to the teachings of this disclosure, and are therefore not described in detail herein.

The electric device 32 is coupled to the second axle 34, and is operable to provide the second axle 34 with a propulsive force or torque. The electric device 32 may include but is not limited to an electric motor, or an electric motor/generator. However, it should be appreciated that the electric device 32 may include some other device capable of converting electrical energy into torque, and supplying that torque to the second axle 34. The electric device 32 may be coupled to the second axle 34 in any suitable manner, using any suitable components, such as but not limited to a gearbox or transmission 26, differential, drive shaft etc. The specific configuration and operation of the electric device 32, and the manner in which the electric device 32 is coupled to and transfers torque to the second axle 34 are not pertinent to the teachings of this disclosure, and are therefore not described in detail herein.

The second axle 34 may be configured in any suitable manner to transfer the propulsive torque from the electric device 32 to at least one wheel 28 attached to the second axle 34. The second axle 34 includes a friction braking device 30 located at each wheel 28 of the second axle 34. The friction braking devices 30 of the second axle 34 use friction to slow rotation of an associated wheel 28, to decelerate the vehicle 20, as is known in the art. The specific configuration and operation of the second axle 34 and the friction braking devices 30 of the second axle 34 are not pertinent to the teachings of this disclosure, and are therefore not described in detail herein.

The internal combustion engine 22 and the electric device 32 may be referred to as de-coupled. As used herein, the term de-coupled is defined as being not mechanically linked, or being mechanically independent of each other, and not directly communicating torque therebetween. Accordingly, the internal combustion engine 22 and the electric device 32 are not mechanically linked to each other, and do not directly communicate torque to and/or from each other. As such, the internal combustion engine 22 operates to provide or not provide propulsive torque to the first axle 24, and the first axle 24 operates to provide or not provide friction braking for the vehicle 20, independently of the electric device 32 and the second axle 34. Similarly, the electric device 32 operates to provide or not provide propulsive torque to the second axle 34, and the second axle 34 operates to provide or not provide friction braking for the vehicle 20, independently of the internal combustion engine 22 and the first axle 24.

In addition to being capable of providing the propulsive torque to the second axle 34, the electric device 32 is also capable of generating an electrical current that may be used to charge or regenerate an energy storage device. The energy storage device may include, but is not limited to, a battery or other similar device that is capable of storing an electrical charge, and providing the stored electrical charge to the electric device 32 for producing the propulsive torque. For example, the electric device 32 may be configured so that rotation of the wheels 28 attached to the second axle 34, may in turn rotate the electric device 32 to generate a charge, which is stored in the energy storage device 38. In so doing, the torque or resistance that the electric device 32 applies against the rotation of the wheels 28, slows the wheels 28 and may decelerate the vehicle 20. The amount of torque or resistance to the rotation of the wheels 28 connected to the second axle may be varied to control the amount of braking that the electric device 32 provides, while still being used to generate electricity to charge the energy storage device 38.

As shown in FIG. 1, and as described herein, the first axle 24 is disposed at the rearward end of the vehicle 20, and may be referred to as a rear axle, whereas the second axle 34 is disposed at the forward end of the vehicle 20, and may be referred to as a front axle. However, the relative positions of the first axle 24 and the second axle 34 may be reversed, with the first axle 24 disposed at the forward end of the vehicle 20 as the front axle, and the second axle 34 disposed at the rearward end of the vehicle 20 as the rear axle.

The vehicle 20 further includes a vehicle controller 36 for controlling the operation of the internal combustion engine 22 and the electric device 32, as well as the first axle 24 and the second axle 34. The vehicle controller 36 may be referred to simply as a controller, as a control module, such as but not limited to an engine control module, a control unit, such as but not limited to an engine control unit, a computer, etc. The vehicle controller 36 may include a computer and/or processor, and include all software, hardware, memory, algorithms, connections, sensors, etc., necessary to manage and control the operation of the vehicle 20, such as the internal combustion engine 22 and the electric device 32. As such, a method, described below and generally shown in FIGS. 2A and 2B, may be embodied as one or more programs or algorithms operable on the vehicle controller 36. It should be appreciated that the vehicle controller 36 may include any device capable of analyzing data from various sensors or other devices, comparing data, making the necessary decisions required to control the operation of the vehicle 20, and executing the required tasks necessary to control the operation of the vehicle 20.

The vehicle controller 36 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller includes tangible, non-transitory memory on which are recorded computer-executable instructions, including an optimized regeneration control algorithm. The processor of the controller is configured for executing the optimized regeneration control algorithm. The optimized regeneration control algorithm implements a method of controlling the vehicle 20, including controlling the internal combustion engine 22 and the electric device 32, the first axle 24, and/or the second axle 34, in order to optimize the regeneration of the energy storage device 38 for the current vehicle dynamic operating conditions.

Figure 2A:
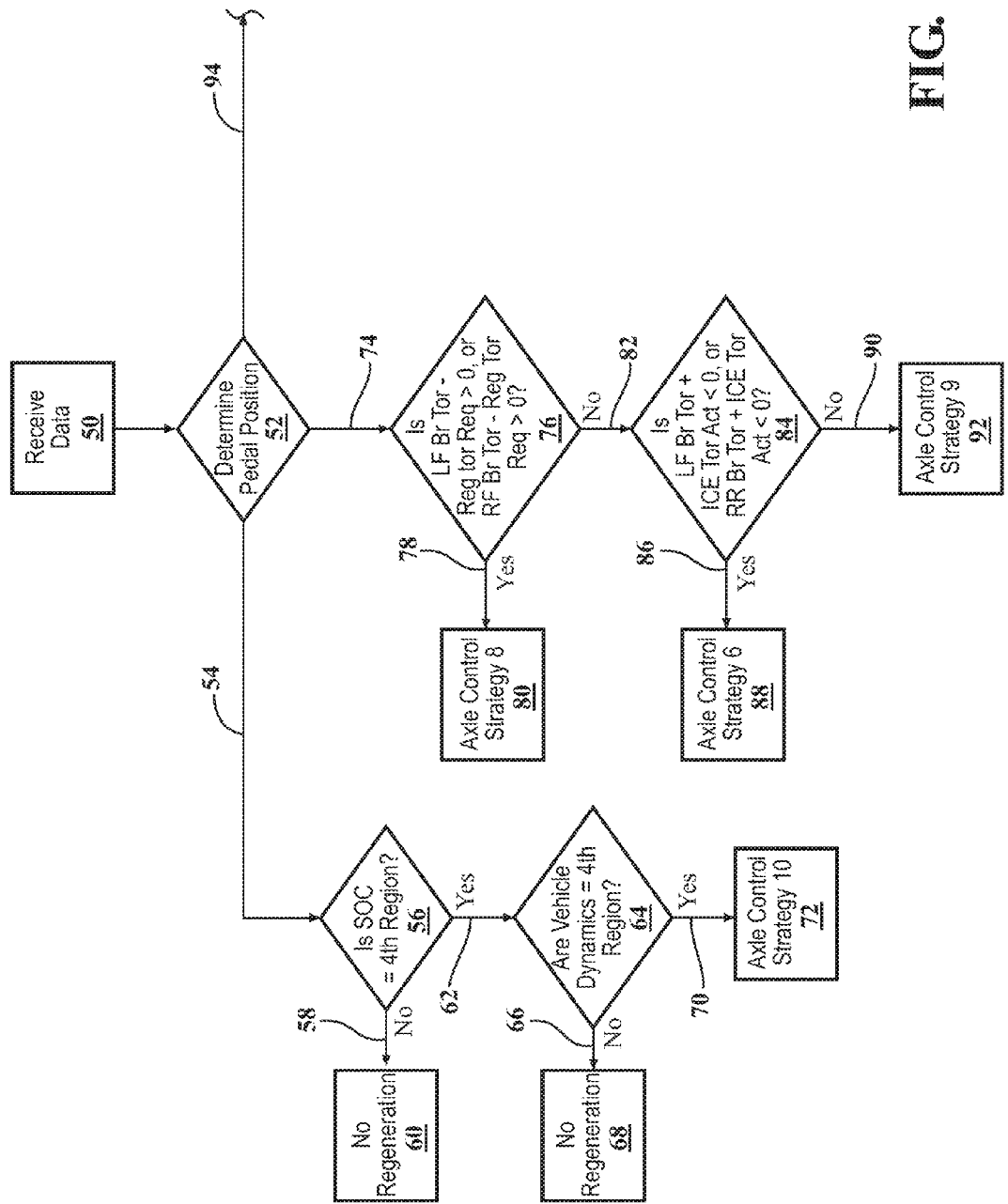
FIG. 2A is a portion of a flowchart representing a method of controlling the vehicle.

Referring to FIG. 2A, the method of controlling the vehicle 20 includes the vehicle controller 36 communicating with and/or receiving data from several different input sources from various different sensors and/or system controllers of the vehicle 20, generally indicated by box 50. For example, the vehicle controller 36 may include data related to a driver's desired acceleration, a driver's desired deceleration, an actual torque from the internal combustion engine 22 (referred to hereinafter referred to as the ICE torque actual), a regeneration torque request, a second axle 34 propulsion torque, a brake pedal position, an accelerator pedal position, an energy storage system State Of Charge (SOC) dependent region (hereinafter referred to as the battery SOC dependent region), a left side second axle 34 friction brake torque (hereinafter referred to as the LF friction brake torque), a right side second axle 34 friction brake torque (hereinafter referred to as the RF friction brake torque), a left side first axle 24 friction brake torque (hereinafter referred to as the LR friction brake torque), and a right side first axle 24 friction brake torque (hereinafter referred to as the RR friction brake torque).

The above inputs may be directly sensed by one or more vehicle 20 sensors, and that data related to the respective input communicated to the vehicle controller 36. Alternatively, the vehicle controller 36 may communicate with other vehicle 20 system controllers to request and receive that data related to the respective inputs. Furthermore, it should be appreciated that the vehicle controller 36 may obtain the inputs required to execute the optimized regeneration control strategy in some other manner not specifically noted or described herein. The different inputs that the vehicle controller 36 uses to implement the optimized regeneration control strategy are known and commonly used by various different vehicle 20 control systems for different vehicle 20 operations. Accordingly, the specific detection and/or the process of determining or calculating each of the above noted inputs into the vehicle controller 36 are known to those skilled in the art, and are therefore not described in detail herein. As used herein, the following inputs are defined as follows.

The "driver's desired acceleration" is an amount or rate of acceleration requested by a driver, such as by depressing the accelerator pedal.

The "driver's desired deceleration" is an amount or rate of deceleration, i.e., negative acceleration, requested by a driver, such as by depressing the brake pedal.

The "ICE torque actual" is the actual amount of torque being output from the internal combustion engine 22.

The "regeneration torque request" is an amount of torque requested to be used toward regeneration or charging of the energy storage device 38.

The "second axle 34 propulsion torque" is the amount of torque that the second axle 34 is supplying to the wheels 28 attached to the second axle 34 for propelling the vehicle 20.

The "brake pedal position" is a position of the brake pedal, and may be defined as being in either a depressed position (e.g., when a driver's desired deceleration is being requested by pressing down on the brake pedal) or a non-depressed position (e.g., when a driver is not depressing the brake pedal). The brake pedal position may be defined in alternative terms as well. For example, the brake pedal position may be defined as being in the non-depressed position when it is disposed in an initial position, which may be defined as a 0% travel, and may be defined as the depressed state based on a length of travel or movement, or a percentage of possible movement from the initial position, i.e., any value greater than 0% travel. Accordingly, it should be appreciated that the depressed position of the brake pedal may include any position other than the non-depressed position. For example, the non-depressed position of the brake pedal may be defined as 0% depressed, and the depressed position of the brake pedal may be defined to include any value greater than 0% depressed, and equal to or less than 100% depressed, i.e., fully depressed.

The "accelerator pedal position" is a position of the accelerator pedal, and may be defined as being in either a depressed position (e.g., when a driver's desired acceleration is being requested by pressing down on the accelerator pedal) or a non-depressed position (e.g., when a driver is not depressing the accelerator pedal). The accelerator pedal position may be defined in alternative terms as well. For example, the accelerator pedal position may be defined as being in the non-depressed position when it is disposed in an initial position, which may be defined as 0% travel of the possible movement of the accelerator pedal, and may be defined as the depressed state based on a length of travel or movement, or a percentage of possible movement from the initial position, i.e., any value greater than 0% travel. Accordingly, it should be appreciated that the depressed position of the accelerator pedal may include any position other than the non-depressed position. For example, the non-depressed position of the accelerator pedal may be defined as 0% depressed, and the depressed position of the accelerator pedal may be defined to include any value greater than 0% depressed, and equal to or less than 100% depressed, i.e., fully depressed.

The "battery SOC dependent region" is one of a plurality of defined regions or modes that enable regeneration of the energy storage device 38 for different dynamic vehicle operating conditions. Specifically, the battery SOC dependent region may be defined as a first region (region 1), a second region (region 2), a third region (region 3), or a fourth region (region 4). Although the exemplary embodiment described herein includes four regions, it should be appreciated that other embodiments may include any number of defined regions or modes. The first region is generally defined as a normal street driving region, in which the dynamic operating conditions of the vehicle 20 are limited to between, for example, 20% to 30% of maximum possible deceleration and lateral acceleration capabilities of the vehicle 20. The second through fourth regions are generally defined as progressively more aggressive driving regions, in which the dynamic operating conditions of the vehicle 20 are less limited than the first region. For example, the second region may be limited to between, for example, 50% to 70% of maximum possible deceleration and lateral acceleration capabilities of the vehicle 20, whereas the third region may include up to 100% of maximum possible deceleration and lateral capabilities. The fourth region may be defined as a region that includes forward acceleration, as well as deceleration and lateral acceleration included in the third region. The fourth region enables regeneration of the energy storage device 38 while the vehicle 20 is accelerating in a forward direction and in a lateral or sideways direction. The fourth region is a driver requested mode, which is selected by the driver, such as by pressing a button to select this mode.

The "LF friction brake torque" is the amount of friction braking currently being applied to the left side of the second axle 34 (front axle in the exemplary embodiment shown in FIG. 1).

The "RF friction brake torque" is the amount of friction braking being applied to the right side of the second axle 34 (front axle in the exemplary embodiment shown in FIG. 1).

The "LR friction brake torque" is the amount of friction braking being applied to the left side of the first axle 24 (rear axle in the exemplary embodiment shown in FIG. 1).

The "RR friction brake torque" is the amount of friction braking being applied to the right side of the first axle 24 (rear axle in the exemplary embodiment shown in FIG. 1).

Once the vehicle controller 36 has received the data related to all necessary vehicle dynamic operating condition inputs, such as described above for example, the vehicle controller 36 follows a process to select one of a plurality of different axle control strategies, which dictate how the first axle 24, the second axle 34, the electric device 32, and/or the internal combustion engine 22 are controlled for the current operating conditions of the vehicle 20. The process begins by determining if the accelerator pedal is disposed in a depressed position, or in a non-depressed position, and determining if the brake pedal is disposed in a depressed position, or in a non-depressed position, generally indicated by box 52.

If the vehicle controller 36 determines that the accelerator pedal is currently disposed in a depressed position, and the brake pedal is currently disposed in a non-depressed position, generally indicated at 54 then the vehicle controller 36 determines if the battery SOC dependent region is set to the fourth region, or if the battery SOC dependent region is not currently set to the fourth region, generally indicated by box 56. As noted above, the battery SOC dependent region must be physically selected by a driver of the vehicle 20. Accordingly, the battery SOC dependent region is only set to equal the fourth region when the driver has specifically requested the vehicle 20 operate in this region.

If the vehicle controller 36 determines that the battery SOC dependent region is not set to equal the fourth region, generally indicated at 58, then the vehicle controller 36 does not authorize or engage in regeneration of the energy storage device 38, generally indicated by box 60.

If the vehicle controller 36 determines that the battery SOC dependent region is set for the fourth region, generally indicated at 62, then the vehicle controller 36 determines if the current vehicle 20 dynamics are currently in the fourth region, generally indicated by box 64. If the vehicle controller 36 determines that the actual vehicle dynamic operating condition dynamics, i.e., the forward and lateral acceleration and/or deceleration of the vehicle 20, are not currently disposed in the fourth region, generally indicated at 66, then the vehicle controller 36 does not authorize or engage in regeneration of the energy storage device 38, generally indicated by box 68. However, if the vehicle controller 36 determines that the actual vehicle dynamic operating condition dynamics, i.e., the forward and lateral acceleration and/or deceleration of the vehicle 20, are currently disposed in the fourth region, i.e., both forward and lateral acceleration, generally indicated at 70, then the vehicle controller 36 selects an axle control strategy, generally indicated by box 72, (hereinafter referred to as axle control strategy 10) in which the second axle 34 is dedicated for use regenerating the energy storage device 38, and the first axle 24 is dedicated for use propelling the vehicle 20.

If the vehicle controller 36 determines that the accelerator pedal is currently disposed in the non-depressed position, and the brake pedal is currently disposed in the depressed position, generally indicated at 74, then the vehicle controller 36 then determines if the numerical difference between the LF friction brake torque minus the regeneration torque request [(LF friction brake torque)−(regeneration torque request)] is greater than zero (0), or if the numerical difference between the RF friction brake torque minus the regeneration torque request [(RF friction brake torque)−(regeneration torque request)] is greater than zero (0), generally indicated by box 76.

If either the numerical difference between the LF friction brake torque minus the regeneration torque request or the numerical difference between the RF friction brake torque minus the regeneration torque request are greater than zero (0), generally indicated at 78, then the vehicle controller 36 selects an axle control strategy, generally indicated by box 80, (hereinafter referred to as axle control strategy 8) in which the second axle 34 is used for both regenerating the energy storage device 38 and friction braking to slow the vehicle 20, and the first axle 24 is used for friction braking to slow the vehicle 20 and to provide a drag torque to slow the rotational speed of the internal combustion engine 22.

If both the numerical difference between the LF friction brake torque minus the regeneration torque request and the numerical difference between the RF friction brake torque minus the regeneration torque request are equal to or less than zero (0), generally indicated at 82, then the vehicle controller 36 determines if the numerical summation of the LR friction brake torque plus the ICE torque actual [(LR friction brake torque)+(ICE torque actual)] is less than zero (0), or if the numerical summation of the RR friction brake torque plus the ICE torque actual [(RR friction brake torque)+(ICE torque actual)] is less than zero (0), generally indicated by box 84.

If either the numerical summation of the LR friction brake torque plus the ICE torque actual is less than zero (0), or the numerical summation of the RR friction brake torque plus the ICE torque actual is less than zero (0), generally indicated at 86, then the vehicle controller 36 selects an axle control strategy, generally indicated by box 88, (hereinafter referred to as axle control strategy 6) in which the second axle 34 is dedicated for regenerating the energy storage device 38, and the first axle 24 is controlled to provide no friction braking, and the torque from the internal combustion engine 22 is reduced by a modified wheel torque target. The modified wheel torque target is the calculated target wheel 28 torque to provide the driver's requested deceleration, as modified by other vehicle 20 systems such as but not limited to an Anti-lock Braking System (ABS), an Electronic Brake force Distribution (EBD) system, a Corner Brake Control (CBC) system, or an Engine Drag Control (EDC) system.

If both the numerical summation of the LR friction brake torque plus the ICE torque actual is equal to or greater than zero (0), and the numerical summation of the RR friction brake torque plus the ICE torque actual is equal to or greater than zero (0), i.e., not less than zero (0), generally indicated at 90, then the vehicle controller 36 selects an axle control strategy, generally indicated by box 92, (hereinafter referred to as axle control strategy 9) in which the second axle 34 is dedicated for regenerating the energy storage device 38, and the first axle 24 is controlled to provide friction braking to slow the vehicle 20, and to provide a drag torque to slow the rotational speed of the internal combustion engine 22.

Figure 2B:
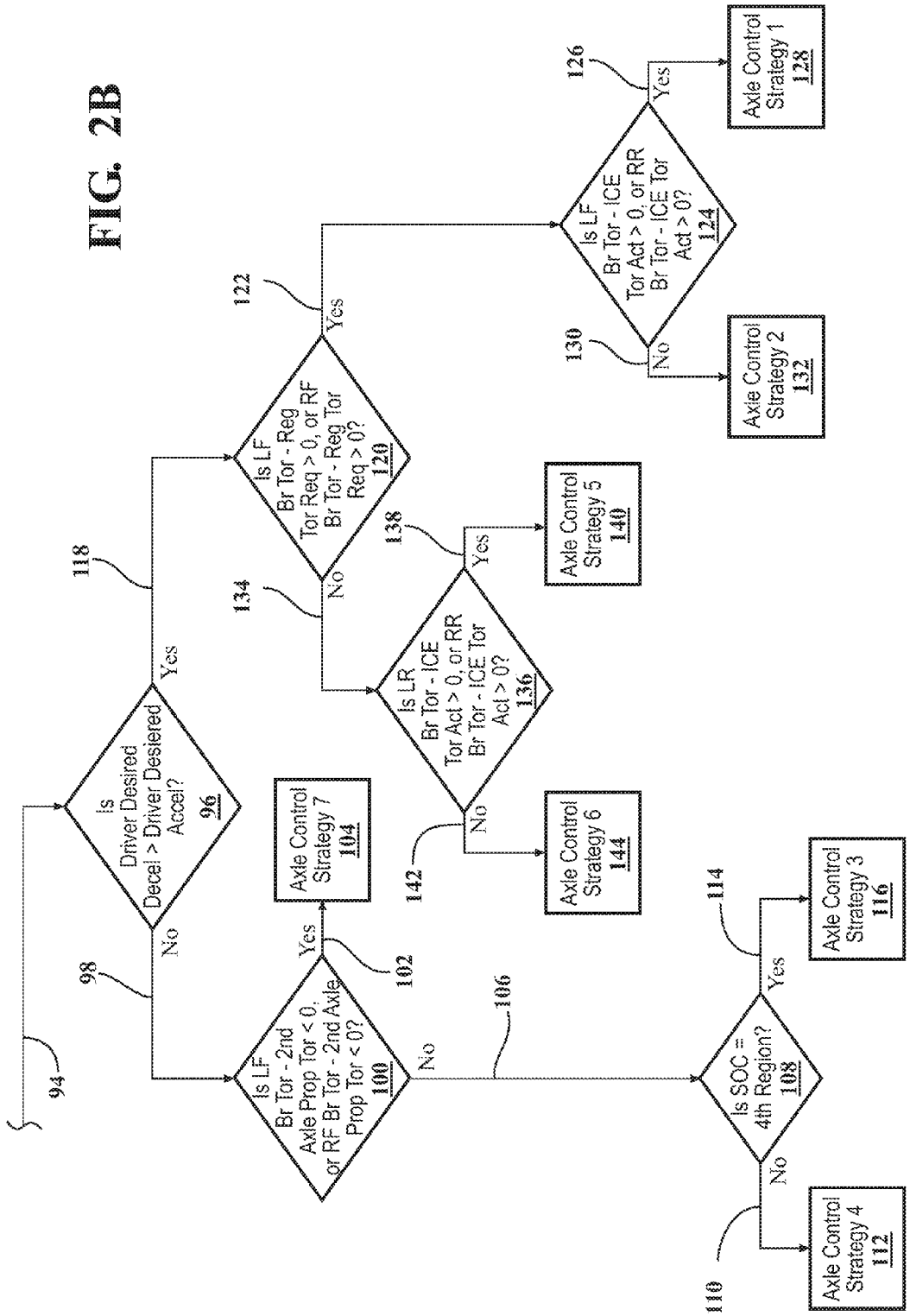
FIG. 2B is a continuation of the flowchart shown in FIG. 2A.

If the vehicle controller 36 determines that the accelerator pedal is currently disposed in the depressed position, and the brake pedal is currently disposed in the depressed position, generally indicated at 94 in FIGS. 2A and 2B, then the vehicle controller 36 determines if the drivers desired deceleration is greater than the driver's desired acceleration, generally indicated by box 96 in FIG. 2B.

Referring to FIG. 2B, if the vehicle controller 36 determines that the driver's desired deceleration is not greater than the driver's desired acceleration, i.e., the driver's desired acceleration is equal to or greater than the driver's desired deceleration, generally indicated at 98, then the vehicle controller 36 determines if the numerical difference between the LF friction brake torque minus the second axle 34 propulsion torque [(LF friction brake torque)−(second axle 34 propulsion torque)] is less than zero (0), or if the numerical difference between the RF friction brake torque minus the second axle 34 propulsion torque [(RF friction brake torque)−(second axle 34 propulsion torque)] is less than zero (0), generally indicated by box 100.

If the vehicle controller 36 determines that either the numerical difference between the LF friction brake torque minus the second axle 34 propulsion torque is less than zero (0), or the numerical difference between the RF friction brake torque minus the second axle 34 propulsion torque is less than zero (0), generally indicated at 102, then the vehicle controller 36 selects an axle control strategy, generally indicated by box 104, (hereinafter referred to as axle control strategy 7) in which the second axle 34 propulsion torque is offset or reduced by modified wheel torque target, and the first axle 24 propulsion torque is offset or reduced by modified wheel 28 target torque.

If the vehicle controller 36 determines that both the numerical difference between the LF friction brake torque minus the second axle 34 propulsion and the numerical difference between the RF friction brake torque minus the second axle 34 propulsion torque are not less than zero (0), generally indicated at 106, then the vehicle controller 36 determines if the battery SOC dependent region is set to the fourth region, or if the battery SOC dependent region is not currently set to the fourth region, generally indicated by box 108. As noted above, the battery SOC dependent region must be physically selected by a driver of the vehicle 20. Accordingly, the battery SOC dependent region is only set to equal the fourth region when the driver has specifically requested the vehicle 20 operate in this region.

If the vehicle controller 36 determines that the battery SOC dependent region is not set to equal the fourth region, generally indicated at 110, then the vehicle controller 36 selects an axle control strategy, generally indicated by box 112, (hereinafter referred to as axle control strategy 4) in which the second axle 34 propulsion torque is reduced by friction, including all or part of the modified wheel torque target, and the first axle 24 is controlled to reduce the friction torque and provide the propulsion torque necessary to achieve the driver's desired acceleration.

If the vehicle controller 36 determines that the battery SOC dependent region is set to equal the fourth region, generally indicated at 114, then the vehicle controller 36 selects an axle control strategy, generally indicated by box 116, (hereinafter referred to as axle control strategy 3) in which the second axle 34 is used for both regenerating the energy storage device 38 and friction braking to slow the vehicle 20, and the first axle 24 is controlled to provide the propulsion torque necessary to achieve the drivers desired acceleration.

If the vehicle controller 36 determines that the driver's desired deceleration is greater than the driver's desired acceleration, generally indicated at 118, then the vehicle controller 36 determines if the numerical difference between the LF friction brake torque minus the regeneration torque request [(LF friction brake torque)−(regeneration torque request)] is greater than zero (0), or if the numerical difference between the RF friction brake torque minus the regeneration torque request [(RF friction brake torque)−(regeneration torque request)] is greater than zero (0), generally indicated by box 120.

If the vehicle controller 36 determines that either the numerical difference between the LF friction brake torque minus the regeneration torque request is greater than zero (0), or the numerical difference between the RF friction brake torque minus the regeneration torque request is greater than zero (0), generally indicated at 122, then the vehicle controller 36 determines if the numerical difference between the LR friction brake torque minus the ICE torque actual [(LR friction brake torque)–(ICE torque actual)] is greater than zero (0), or if the numerical difference between the RR friction brake torque minus the ICE torque actual [(RR friction brake torque)–(ICE torque actual)] is greater than zero (0), generally indicated by box 124.

If the vehicle controller 36 determines that either the numerical difference between the LR friction brake torque minus the ICE torque actual is greater than zero (0), or the numerical difference between the RR friction brake torque minus the ICE torque actual is greater than zero (0), generally indicated at 126, then the vehicle controller 36 selects an axle control strategy generally indicated by box 128 (hereinafter referred to as axle control strategy 1) in which the second axle 34 is used for both regenerating the energy storage device 38 and friction braking to slow the vehicle 20, and the ICE torque actual is reduced to nearly 0 Nm, and the friction brake torque for the first axle 24 is reduced by an amount equivalent to the torque reduction in the ICE torque actual.

If the vehicle controller 36 determines that both the numerical difference between the LR friction brake torque minus the ICE torque actual and the numerical difference between the RR friction brake torque minus the ICE torque actual are not greater than zero (0), generally indicated at 130, then the vehicle controller 36 selects an axle control strategy, generally indicated by box 132 (hereinafter referred to as axle control strategy 2) in which the second axle 34 is dedicated for regeneration of the energy storage device 38, and the first axle 24 is controlled to provide no friction braking, and the ICE torque actual is reduced by an amount equal to the modified wheel torque target.

If the vehicle controller 36 determines that both the numerical difference between the LF friction brake torque minus the regeneration torque request is not greater than zero (0), and the numerical difference between the RF friction brake torque minus the regeneration torque request is not greater than zero (0), generally indicated at 134, then the vehicle controller 36 determines if the numerical difference between the LR friction brake torque minus the ICE torque actual [(LR friction brake torque)–(ICE torque actual)] is greater than zero (0), or if the numerical difference between the RR friction brake torque minus the ICE torque actual [(RR friction brake torque)–(ICE torque actual)] is greater than zero (0), generally indicated by box 136.

If the vehicle controller 36 determines that either the numerical difference between the LR friction brake torque minus the ICE torque actual is greater than zero (0), or the numerical difference between the RR friction brake torque minus the ICE torque actual is greater than zero (0), generally indicated at 138, then the vehicle controller 36 selects an axle control strategy, generally indicated by box 140, (hereinafter referred to as axle control strategy 5) in which the second axle 34 is dedicated for regeneration of the energy storage device 38, the ICE torque actual is reduced to nearly 0 Nm, and the friction brake torque for the first axle 24 is reduced by an amount equivalent to the torque reduction in the ICE torque actual.

If the vehicle controller 36 determines that both the numerical difference between the LR friction brake torque minus the ICE torque actual and the numerical difference between the RR friction brake torque minus the ICE torque actual are not greater than zero (0), generally indicated at 142, then the vehicle controller 36 selects an axle control strategy, generally indicated by box 144, (hereinafter referred to as axle control strategy 6) in which the second axle 34 is dedicated for regeneration of the energy storage device 38, and the first axle 24 is controlled to provide no friction braking, and the ICE torque actual is reduced by an amount equal to the modified wheel torque target.

Once the vehicle controller 36 has selected the axle control strategy for the specific, current operating conditions of the vehicle 20, the vehicle controller 36 may then send or communicate a control signal to the respective components of the vehicle 20, in order to implement the selected axle control strategy. Accordingly, the vehicle controller 36 may modify the friction braking applied at the wheels 28 for one or both of the first axle 24 and/or the second axle 34, the vehicle controller 36 may increase or reduce the torque output from the internal combustion engine 22 and/or the electric device 32, and the vehicle controller 36 may control the electric device 32 to provide a desired amount of regeneration for charging for the energy storage device 38.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of controlling a vehicle having a first axle driven by an internal combustion engine, a second axle driven by a second power source, and an energy storage device, wherein the internal combustion engine and the second power source are mechanically independent of each other and do not directly communicate torque to each other, the method comprising:

sensing a position of an accelerator pedal to determine if the accelerator pedal is in a depressed position, or if the accelerator pedal is in a non-depressed position;

sensing a position of a brake pedal to determine if the brake pedal is in a depressed position, or if the brake pedal is in a non-depressed position;

selecting an axle control strategy, with a vehicle controller, to control energy regeneration of the energy storage device based on the position of the accelerator pedal being either the depressed position or the non-depressed position, and the position of the brake pedal being either the depressed position or the non-depressed position;

sending a control signal from the vehicle controller to at least one vehicle component to implement the selected axle control strategy;

determining at least one vehicle parameter, wherein the at least one vehicle parameter includes one of: a driver desired acceleration, a driver desired deceleration, an actual torque of the internal combustion engine, a regeneration torque request, a first axle propulsive torque, a second axle propulsive torque, a state of charge dependent region, a left side first axle friction brake torque, a right side first axle friction brake torque, a left side second axle friction brake torque, a right side second axle friction brake torque, and a modified wheel torque target; and blocking regeneration of the energy storage device when the accelerator pedal is disposed in the depressed position, the brake pedal is disposed in the non-depressed position, and the state of charge dependent region is not set to a fourth region, wherein the fourth region is a user selected region that enables regeneration of the energy storage device during forward acceleration of the vehicle, lateral acceleration of the vehicle, or deceleration of the vehicle.

2. The method set forth in claim 1, further comprising blocking regeneration of the energy storage device when the accelerator pedal is disposed in the depressed position, the brake pedal is disposed in the non-depressed position, the state of charge dependent region is set to a fourth region, and current operating dynamics of the vehicle are not currently within the fourth region, wherein the fourth region is a user selected region that enables regeneration of the energy storage device during forward acceleration of the vehicle, lateral acceleration of the vehicle, or deceleration of the vehicle.

3. The method set forth in claim 1, wherein selecting the axle control strategy includes selecting the axle control strategy that dedicates the second axle for regeneration of the energy storage device, and dedicates the first axle for propulsion of the vehicle, when the accelerator pedal is disposed in the depressed position, the brake pedal is disposed in the non-depressed position, the state of charge dependent region is set to a fourth region, and current operating dynamics of the vehicle are currently within the fourth region, wherein the fourth region is a user selected region that enables regeneration of the energy storage device during forward acceleration of the vehicle, lateral acceleration of the vehicle, or deceleration of the vehicle.

4. The method set forth in claim 1, wherein selecting the axle control strategy includes selecting the axle control strategy that controls the second axle for both regeneration of the energy storage device and friction braking to slow the vehicle, and controls the first axle for friction braking to slow the vehicle and provide a drag torque to slow a rotational speed of the internal combustion engine, when the accelerator pedal is disposed in the non-depressed position, the brake pedal is disposed in the depressed position, and either a numerical difference between the left first axle friction brake torque minus the regeneration torque request is greater than zero or a numerical difference between the right first axle friction brake torque and the regeneration torque request is greater than zero.

5. The method set forth in claim 1, wherein selecting the axle control strategy includes selecting the axle control strategy that dedicates the second axle for regeneration of the energy storage device, controls the first axle to provide no friction braking, and controls the internal combustion engine to reduce the actual torque of the internal combustion engine by the modified wheel torque target, when the accelerator pedal is disposed in the non-depressed position, the brake pedal is disposed in the depressed position, both a numerical difference between the left first axle friction brake torque minus the regeneration torque request and a numerical difference between the right first axle friction brake torque and the regeneration torque request are less than zero, and either a numerical summation of the left first axle friction brake torque plus the actual torque of the internal combustion engine is less than zero or a numerical summation of the right first axle friction brake torque plus the actual torque of the internal combustion engine is less than zero.

6. The method set forth in claim 1, wherein selecting the axle control strategy includes selecting the axle control strategy that dedicates the second axle for regeneration of the energy storage device, controls the first axle to provide friction braking to slow the vehicle, and controls the first axle to provide drag torque to slow a rotational speed of the internal combustion engine, when the accelerator pedal is disposed in the non-depressed position, the brake pedal is disposed in the depressed position, both a numerical difference between the left first axle friction brake torque minus the regeneration torque request and a numerical difference between the right first axle friction brake torque and the regeneration torque request are less than zero, and both a numerical summation of the left first axle friction brake torque plus the actual torque of the internal combustion engine and a numerical summation of the right first axle friction brake torque plus the actual torque of the internal combustion engine are equal to or greater than zero.

7. The method set forth in claim 1, wherein selecting the axle control strategy includes selecting a strategy that offsets the second axle propulsive torque by the modified wheel torque target, and offsets the first axle propulsive torque by the modified wheel torque target, when the accelerator pedal is disposed in the depressed position, the brake pedal is disposed in the depressed position, the driver's desired deceleration is not greater than the driver's desired acceleration, and either a numerical difference between the left first axle friction brake torque minus the second axle propulsive torque is less than zero or a numerical difference between the right first axle friction brake torque minus the second axle propulsion torque is less than zero.

8. The method set forth in claim 1, wherein selecting the axle control strategy includes selecting a strategy that reduces the second axle propulsive torque by friction, including all or part of the modified wheel torque target, and controls the first axle to reduce the friction torque of the first axle and provide the propulsive torque necessary to achieve the driver's desired acceleration, when the accelerator pedal is disposed in the depressed position, the brake pedal is disposed in the depressed position, the driver's desired deceleration is not greater than the driver's desired acceleration, both a numerical difference between the left first axle friction brake torque minus the second axle propulsive torque and a numerical difference between the right first axle friction brake torque minus the second axle propulsion torque is equal to or greater than zero, and the state of charge dependent region is not set to a fourth region, wherein the fourth region is a user selected region that enables regeneration of the energy storage device during forward acceleration of the vehicle, lateral acceleration of the vehicle, or deceleration of the vehicle.

9. The method set forth in claim 1, wherein selecting the axle control strategy includes selecting a strategy that uses the second axle for both regeneration of the energy storage device and friction braking to slow the vehicle, and the first axle is controlled to provide the propulsive torque necessary to achieve the driver's desired acceleration, when the accelerator pedal is disposed in the depressed position, the brake pedal is disposed in the depressed position, the driver's desired deceleration is not greater than the driver's desired acceleration, both a numerical difference between the left first axle friction brake torque minus the second axle propulsive torque and a numerical difference between the right first axle friction brake torque minus the second axle propulsion torque is equal to or greater than zero, and the state of charge dependent region is set to a fourth region, wherein the fourth region is a user selected region that enables regeneration of the energy storage device during forward acceleration of the vehicle, lateral acceleration of the vehicle, or deceleration of the vehicle.

10. The method set forth in claim 1, wherein selecting the axle control strategy includes selecting a strategy that controls the second axle for both regeneration of the energy storage device and friction braking to slow the vehicle, and reduces the actual torque of the internal combustion engine to approximately 0 Nm, and reduces friction torque of the first axle by an amount approximately equivalent to the torque reduction in the actual torque of the internal combustion engine, when the accelerator pedal is disposed in the depressed position, the brake pedal is disposed in the depressed position, the driver's desired deceleration is greater than the driver's desired acceleration, either a numerical difference between the left first axle friction brake torque minus the regeneration torque request is greater than zero, or a numerical difference between the right first axle friction brake torque minus the regeneration torque request is greater than zero, and either a numerical difference between the left second axle friction brake torque minus the actual torque of the internal combustion engine is greater than zero or a numerical difference between the right second axle friction brake torque minus the actual torque of the internal combustion engine is greater than zero.

11. The method set forth in claim 1, wherein selecting the axle control strategy includes selecting a strategy that dedicates the second axle for regeneration of the energy storage device, controls the first axle to provide no friction braking, and reduces the actual torque of the internal combustion engine by an amount equal to the modified wheel torque target, when the accelerator pedal is disposed in the depressed position, the brake pedal is disposed in the depressed position, the driver's desired deceleration is greater than the driver's desired acceleration, either a numerical difference between the left first axle friction brake torque minus the regeneration torque request is greater than zero, or a numerical difference between the right first axle friction brake torque minus the regeneration torque request is greater than zero, and both a numerical difference between the left second axle friction brake torque minus the actual torque of the internal combustion engine and a numerical difference between the right second axle friction brake torque minus the actual torque of the internal combustion engine are not greater than zero.

12. The method set forth in claim 1, wherein selecting the axle control strategy includes selecting a strategy that dedicates the second axle for regeneration of the energy storage device, reduces the actual torque of the internal combustion engine to approximately 0 Nm, and reduces friction torque of the first axle by an amount approximately equivalent to the torque reduction in the actual torque of the internal combustion engine, when the accelerator pedal is disposed in the depressed position, the brake pedal is disposed in the depressed position, the driver's desired deceleration is greater than the driver's desired acceleration, both a numerical difference between the left first axle friction brake torque minus the regeneration torque request and a numerical difference between the right first axle friction brake torque minus the regeneration torque request are not greater than zero, and either a numerical difference between the left second axle friction brake torque minus the actual torque of the internal combustion engine is greater than zero or a numerical difference between the right second axle friction brake torque minus the actual torque of the internal combustion engine is greater than zero.

13. The method set forth in claim 1, wherein selecting the axle control strategy includes selecting a strategy that dedicates the second axle for regeneration of the energy storage device, controls the first axle to provide no friction braking, and reduces the actual torque of the internal combustion engine by an amount equal to the modified wheel torque target, when the accelerator pedal is disposed in the depressed position, the brake pedal is disposed in the depressed position, the driver's desired deceleration is greater than the driver's desired acceleration, both a numerical difference between the left first axle friction brake torque minus the regeneration torque request and a numerical difference between the right first axle friction brake torque minus the regeneration torque request are not greater than zero, and both a numerical difference between the left second axle friction brake torque minus the actual torque of the internal combustion and a numerical difference between the right second axle friction brake torque minus the actual torque of the internal combustion engine are not greater than zero.

14. A vehicle comprising:
an internal combustion engine;
a first axle coupled to and powered by the internal combustion engine, wherein the first axle includes at least one wheel having a friction device coupled to the at least one wheel of the first axle and operable to slow rotation of the at least one wheel of the first axle in response to a control signal;
a second power source, wherein the internal combustion engine and the second power source are mechanically independent of each other and do not directly communicate torque to each other;
a second axle coupled to and powered by the second power source, wherein the second axle includes at least one wheel having a friction device coupled to the at least one wheel of the second axle and operable to slow rotation of the at least one wheel of the second axle in response to a control signal;
an energy storage device coupled to at least one of the first axle and the second axle, and operable for storing energy therein; and
a vehicle controller coupled to the internal combustion engine, the first axle, the second power source, and the second axle, wherein the vehicle controller includes a processor and a memory having an optimized regeneration control algorithm saved thereon, wherein the processor is operable to execute the optimized regeneration control algorithm to:
determine at least one vehicle parameter, wherein the at least one vehicle parameter includes one of: a position of an accelerator pedal, a position of a brake pedal, a driver desired acceleration, a driver desired deceleration, an actual torque of the internal combustion engine, a regeneration torque request, a first axle propulsive torque, a second axle propulsive torque, a state of charge dependent region, a left side first axle friction brake torque, a right side first axle friction brake torque, a left side second axle friction brake torque, a right side second axle friction brake torque, and a modified wheel torque target;
determine if the state of charge dependent region includes a user selected region that enables regeneration of the energy storage device during forward acceleration of the vehicle, lateral acceleration of the vehicle, or deceleration of the vehicle;
select an axle control strategy to control energy regeneration of the energy storage device based on the position of the accelerator pedal being either a depressed position or a non-depressed position, and the position of the brake pedal being either a depressed position or a non-depressed position; and
send a control signal to at least one of the first axle, the second axle, the internal combustion engine, and the second power source, to change a state of one of the first axle, the second axle, the internal combustion engine, or the second power source, to implement the selected axle control strategy.

15. The vehicle set forth in claim 14, wherein the optimized regeneration control algorithm is executable to determine if the brake pedal is disposed in the depressed position or the non-depressed position, and determine if the accelerator pedal is disposed in the depressed position or the non-depressed position.

16. The vehicle set forth in claim 14, wherein the optimized regeneration control algorithm is executable to determine if current vehicle operating dynamics are currently within a set of dynamic conditions defined by the user selected region that enables regeneration of the energy storage device during forward acceleration of the vehicle, lateral acceleration of the vehicle, or deceleration of the vehicle.

17. The vehicle set forth in claim 14, wherein the optimized regeneration control algorithm is executable to determine if the driver desired deceleration is greater than the driver desired acceleration.

* * * * *